(12) United States Patent
Chiou et al.

(10) Patent No.: US 6,382,049 B1
(45) Date of Patent: May 7, 2002

(54) SHAKING MOMENT BALANCER

(75) Inventors: Shen-Tarng Chiou; Jong-Chyuan Tzou, both of Tainan; Chorng-Shian Huang, Yungkang City, all of (TW)

(73) Assignee: National Science Council (TW)

( * ) Notice: Subject to any disclaimer, the term of this patent is extended or adjusted under 35 U.S.C. 154(b) by 0 days.

(21) Appl. No.: 09/519,181

(22) Filed: Mar. 6, 2000

(30) Foreign Application Priority Data

Apr. 2, 1999 (TW) .......................................... 88205120

(51) Int. Cl.[7] .............................................. F16F 15/22
(52) U.S. Cl. ........................... 74/573 R; 74/572; 74/574
(58) Field of Search .............. 74/572–574; 364/571.01; 73/66

(56) References Cited

U.S. PATENT DOCUMENTS

| | | | | |
|---|---|---|---|---|
| 3,702,082 A | * | 11/1972 | Decker ......................... | 74/573 |
| 3,776,065 A | * | 12/1973 | Unno et al. .................... | 74/573 |
| 3,955,429 A | * | 5/1976 | Holden .......................... | 74/64 |
| 5,272,937 A | * | 12/1993 | Brosowske et al. ........ | 74/573 R |
| 5,450,337 A | * | 9/1995 | Chuan-Yuan et al. .. | 364/571.01 |
| 5,533,422 A | * | 7/1996 | Spechart .................... | 74/573 R |
| 5,740,701 A | * | 4/1998 | Hauser ......................... | 74/570 |
| 6,082,186 A | * | 7/2000 | Detwiler ........................ | 73/66 |

FOREIGN PATENT DOCUMENTS

| | | | | |
|---|---|---|---|---|
| JP | 58-91951 | * | 6/1983 | ............... 74/573 R |

* cited by examiner

*Primary Examiner*—Vinh T. Luong
(74) *Attorney, Agent, or Firm*—Greer, Burns & Crain, Ltd.

(57) ABSTRACT

A shaking moment balancer is designed for balancing an unbalanced moment in a machine. This apparatus includes a housing for setting the balancer therein, an input shaft set mounted in the housing, a first mating weight unit mounted in the housing and having a plurality of first mating weights for generating a first inertial moment in a first direction, and a plurality of first slots for adjustably mounting the plurality of first mating weights thereon, a second mating weight unit mounted in the housing and having a plurality of second mating weights for generating a second inertial moment in a second direction, and a plurality of second slots for adjustably mounting the plurality of second mating weights thereon, and a transmitting unit connected between the input shaft set and the mating weight units for driving the mating weight units to rotate at the speed the same as or a multiple of that of the input shaft.

20 Claims, 6 Drawing Sheets

SHAKING MOMENT BALANCER

FIELD OF THE INVENTION

The present invention relates to a shaking moment balancer for balancing a shaking moment of a machine.

BACKGROUND OF THE INVENTION

When a machine is running, it is inevitable that the machine will encounter some shaking moment or vibrating moment because the shaking force or vibrating force of the elements of the machine is impossible to be balanced in all directions. If the shaking moment is not balanced, the elements of the machine will always be in a shaking state. This situation makes the elements of the machine worn away easily thereby shortening the useful life of the machine. Therefore, in order to avoid the vibration of the machine, some balancers are added on the shafts of the machine to balance the shaking moment. FIG. 1 shows the most commonly used shaking moment balancer. As shown in FIG. 1, by oppositely mounting a pair of mating weights 33 on the rims of two shafts rotating in the same direction, an inertial moment is generated by the mating weights to balance the shaking moment of a machine.

However, the conventional balancer still has some drawbacks as follows.
1. For every machine, the shaking moment is balanced by mounting a specific mating weight having a specific weight in a specific position. The weight and position of the mating weight should be calculated precisely and must be suitable for that specific machine unless the weight and position are recalculated.
2. When once a mating weight is mounted on a machine, it is difficult to make further fine adjustment if the shaking moment of the machine is changed.
3. The conventional balancer is a plurality of mating weights mounted on a machine, and the mating weights are not modularized as a replaceable, maintainable, and renewable assemblage so that the cost is increased.
4. The inertial moment generated by the balancer is only in one direction, but the shaking moment generated by the machine is multi-direction.

It is impossible to balance two shaking moments in two directions by one balancer.

It is therefore attempted by the applicant to deal with the above situation encountered with the prior art.

SUMMARY OF THE INVENTION

An object of the present invention is to provide a novel shaking moment balancer such that the aforementioned limitations and difficulties encountered in the prior art can be overcome.

Another object of the present invention is to provide a novel shaking moment balancer for balancing an unbalanced moment in a machine.

A further object of the present invention is to provide a novel modularized shaking moment balancer which is advantageous to be maintained and replaced.

A further object of the present invention is to provide a novel shaking moment balancer having two mating weight units, such that the inertial moment of the balancer can be adjusted to balance the shaking moment of a machine precisely and conveniently.

A further object of the present invention is to provide a novel shaking moment balancer which can balance a frequency term of the shaking moment whose direction is on a plane either perpendicular or parallel to its input shaft.

The shaking moment balancer includes a housing, an input shaft set, a mating weight unit, and a transmitting unit. The input shaft set is mounted in the housing for inputting a driving torque. The mating weight unit has a plurality of mating weights for generating an inertial moment to balance the unbalanced moment and a plurality of slots for adjustably mounting the mating weights thereon. The transmitting unit is mounted in the housing and connected between the input shaft set and the mating weight unit for driving the mating weight unit to rotate in response to the driving torque.

According to the present invention, the shaking moment balancer further includes a speed-changer device having a first and second pairs of gears mounted in the housing and connected to the transmitting unit for changing the rotation speed of the mating weight unit by changing the engagement state between the two pairs of gears.

In accordance with the present invention, the first pair of gears have the same radius and tooth number for making the mating weight unit rotate at a first speed, the same as that of the input shaft; and the second pair of gears have different radiuses and tooth numbers for making the mating weight unit rotate at a second speed different to that of the input shaft.

In accordance with the present invention, a gear ratio of the second pair of gears is an integer so that the rotation speed of the mating weight unit is an integral multiple of that of the input shaft.

Further, the gear ratio of the second pair of gears is 2, and the rotation speed of the matting weight unit is two times of that of the input shaft.

According to the present invention, the mating weight unit further includes two rotating gears, for setting the slots and the mating weights thereon, and an idler connected between the two rotating gears for making the two rotating gears rotate in the same direction.

In accordance with the present invention, the mating weight unit further includes two mating weight disks mounted on the two rotating gears respectively for setting the slots and the mating weights thereon.

In accordance with the present invention, the mating weight unit further includes a plurality of screws and nuts for securing the mating weights in the slots.

In accordance with the present invention, the slots includes a plurality of arc slots setting near the circumference of the mating weight disks, and a plurality of radial slots radially setting from the center of the mating weight disks.

According to the present invention, the transmitting unit includes a plurality of bevel gears and a plurality of transmission shafts for transmitting the driving torque to drive the mating weight unit.

In another embodiment of the present invention, the shaking moment balancer for balancing an unbalanced moment in a machine, includes a housing, an input shaft set, the first mating weight unit, the second mating weight unit, a transmitting unit. The housing is used for setting the shaking moment balancer therein. The input shaft set is mounted in the housing for inputting a driving torque. The first mating weight unit has a plurality of first mating weights for generating a first inertial moment in a first direction, and a plurality of first slots for adjustably mounting the plurality of first mating weights thereon. The second mating weight unit has a plurality of second mating weights for generating a second inertial moment in second direction, and a plurality of second slots for adjustably mounting the plurality of second mating weights thereon. The transmitting unit is mounted in the housing and connected to the input shaft set and the mating weight units for driving the mating weight units to rotate at the specified speed. The combination of the inertial moments in the first direction and the second direction can balance a frequency term of the shaking moment in the direction on a plane parallel or perpendicular to said input shaft.

According to the present invention, the first mating weight unit further includes two first rotating gears for setting the first slots and the first mating weights thereon and a first idler connected between the two first rotating gears for making the two rotating gears rotate in the same direction.

According to the present invention, the second mating weight unit further includes two second rotating gears for setting the second slots and the second mating weights thereon and a second idler connected between the two second rotating gears for making the two rotating gears rotate in the same direction.

The present invention may best be understood through the following description with reference to the accompanying drawings, in which:

DETAILED DESCRIPTION OF THE PREFERRED EMBODIMENTS

Figure 1:
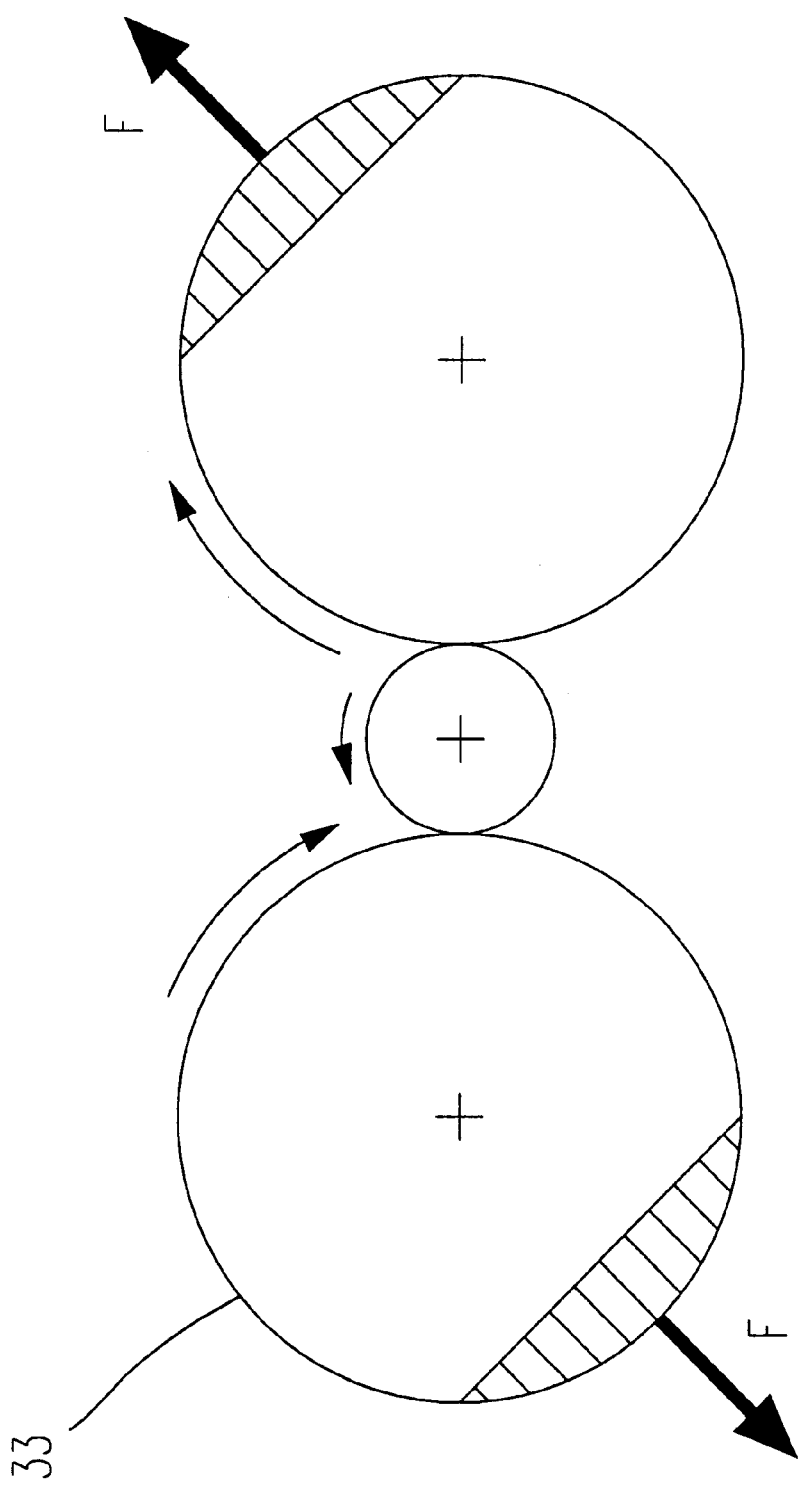
FIG. 1 schematically shows the conventional shaking moment balancer.
Figure 2:
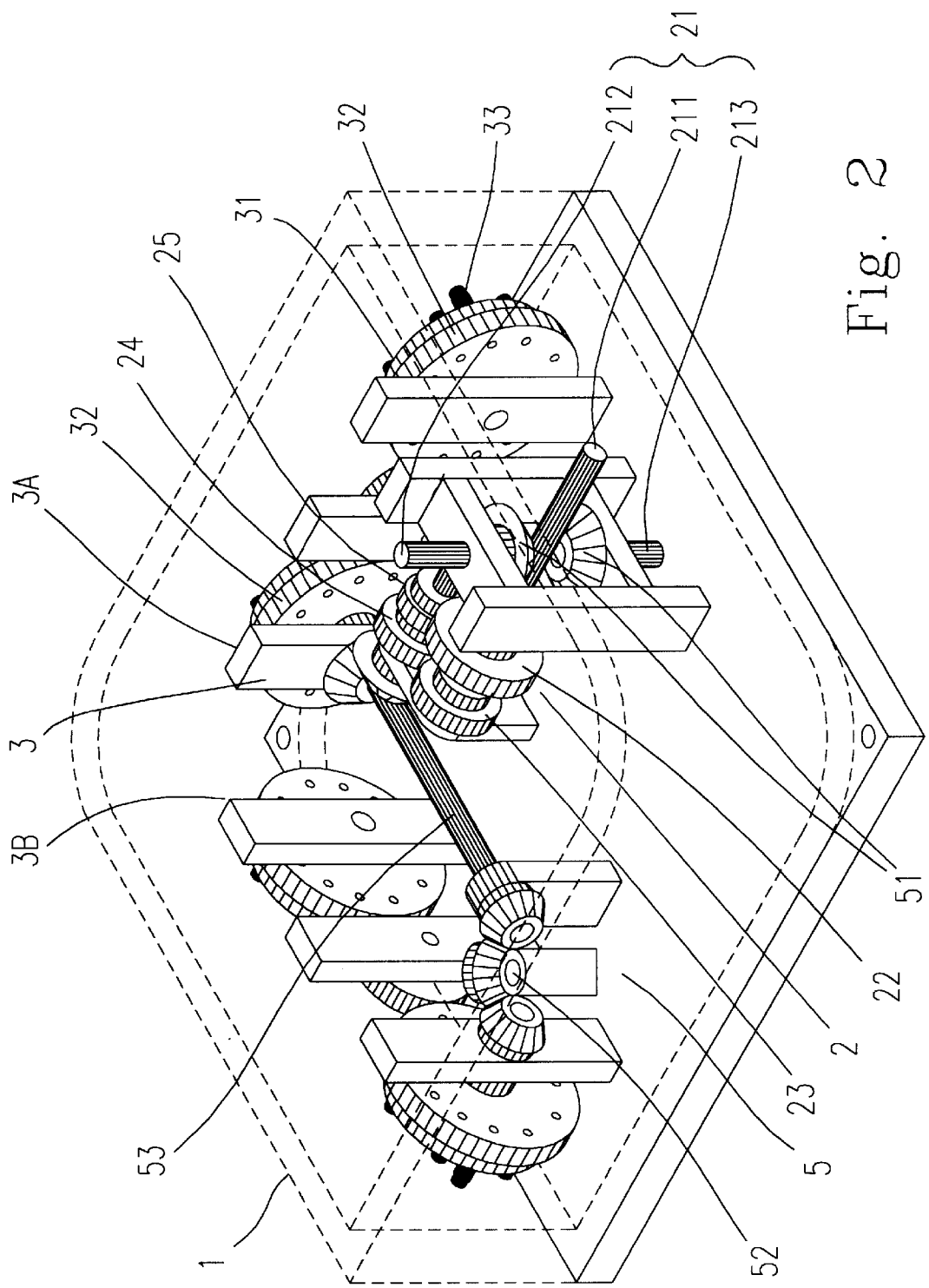
FIG. 2 schematically shows the shaking moment balancer of the present invention viewing from a first direction.
Figure 3:
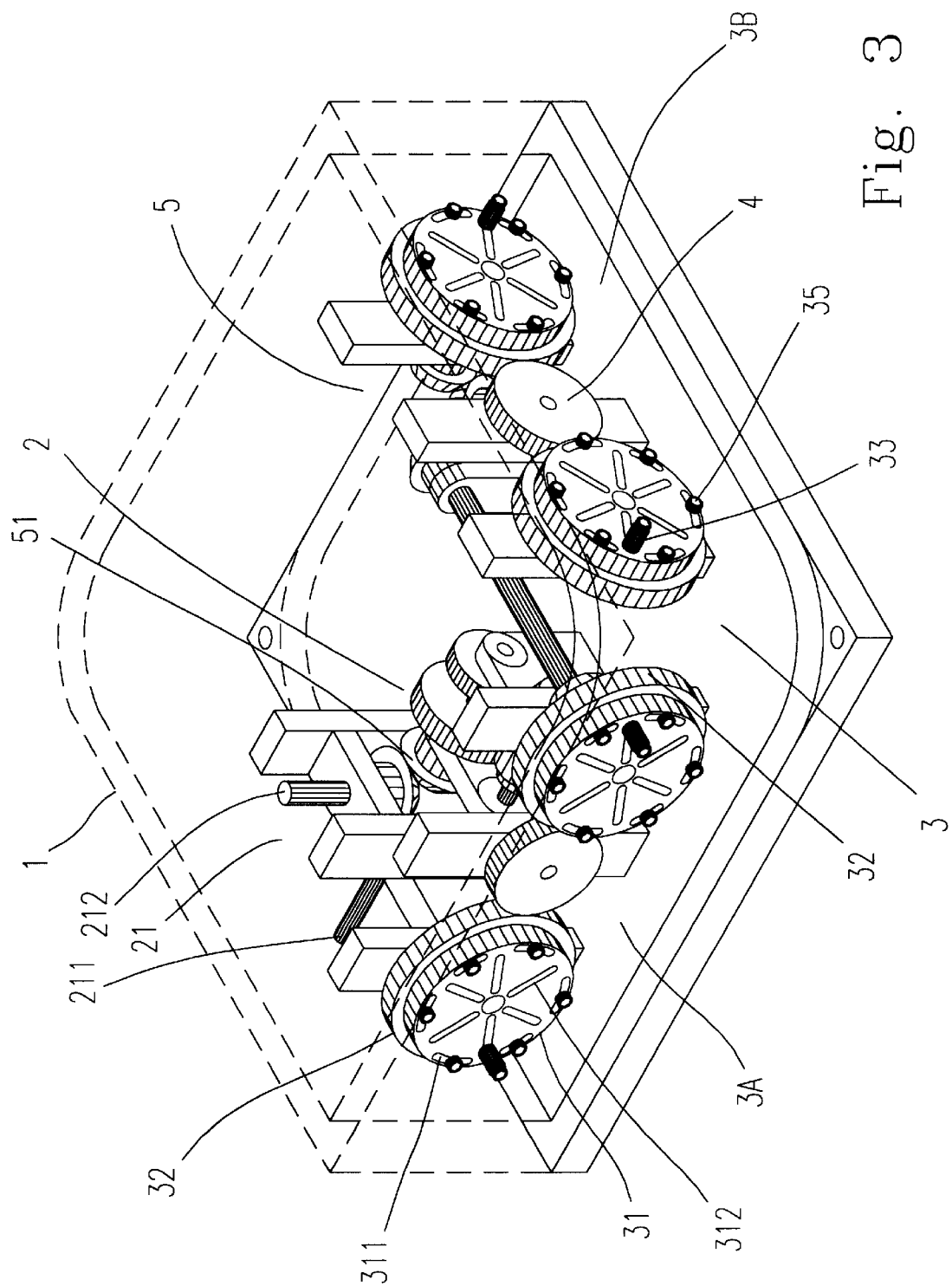
FIG. 3 schematically shows the shaking moment balancer of the present invention viewing from a second direction opposite to the first direction of FIG. 2.

The shaking moment balancer of the present invention is shown in FIG. 2 and FIG. 3. The shaking moment balancer is used for balancing the shaking moment of a machine. It includes a housing 1, a speed-changer device 2, a transmitting unit 5, the input shaft set 21, and two mating weight units 3. The mating weight units 3 has a plurality of mating weights 33 for generating an inertial moment to balance the unbalanced moment and has a plurality of slots 312 for adjustably mounting the mating weights 33 thereon. The speed-changer device 2 is connected to the transmitting unit 5 for changing the rotation speed of the mating weight units 3. The input shaft set 21 comprises shafts 211, 212 and 213, but only one of them can be used as the input shaft, for inputting a driving torque from a power source (such as an engine or a motor). As shown in FIG. 3, shafts 211, 212 and 213 are staved into their respective bevel gears 51 so that a driving torque from different directions can also be utilized. The transmitting unit 5 is connected between the mating weight units 3 and the input shaft set 21 for driving the mating weight units 3. Consequently, an inertial moment is generated by rotating the mating weight units 3 to balance the shaking moment of the machine.

The speed-changer device 2 includes two pairs of gears, but only one pair of gears can be engaged. As shown in FIG. 2, the first pair of gears 23 and 24 have the same radius and tooth number. Therefore, when they are engaged, the rotating speed of the input shaft and that of the mating weight units 3 will be the same. As shown in FIG. 2, the second pair of gears 22 and 25 have different radiuses and tooth numbers. In general, the radius and tooth number of gear 22 are a multiple of those of gear 25. Therefore, when they are engaged, the rotating speed of the mating weight units 3 will be a multiple of that of the input shaft. For example, if the ratio of the tooth numbers of the second pair of gears 22 and 25 is 2:1, the rotating speed of the mating weight units 3 is two times of that of the input shaft. Consequently, if they are engaged, the mating weights will generate an inertial moment of the second frequency term. In order to switch the engagement condition of the speed-changer device 2, from the first pair of gears 23 and 24 to the second pair of gears 22 and 25, gears 23 and 25 should be movable (the moving direction is shown in FIG. 6).

Figure 4:
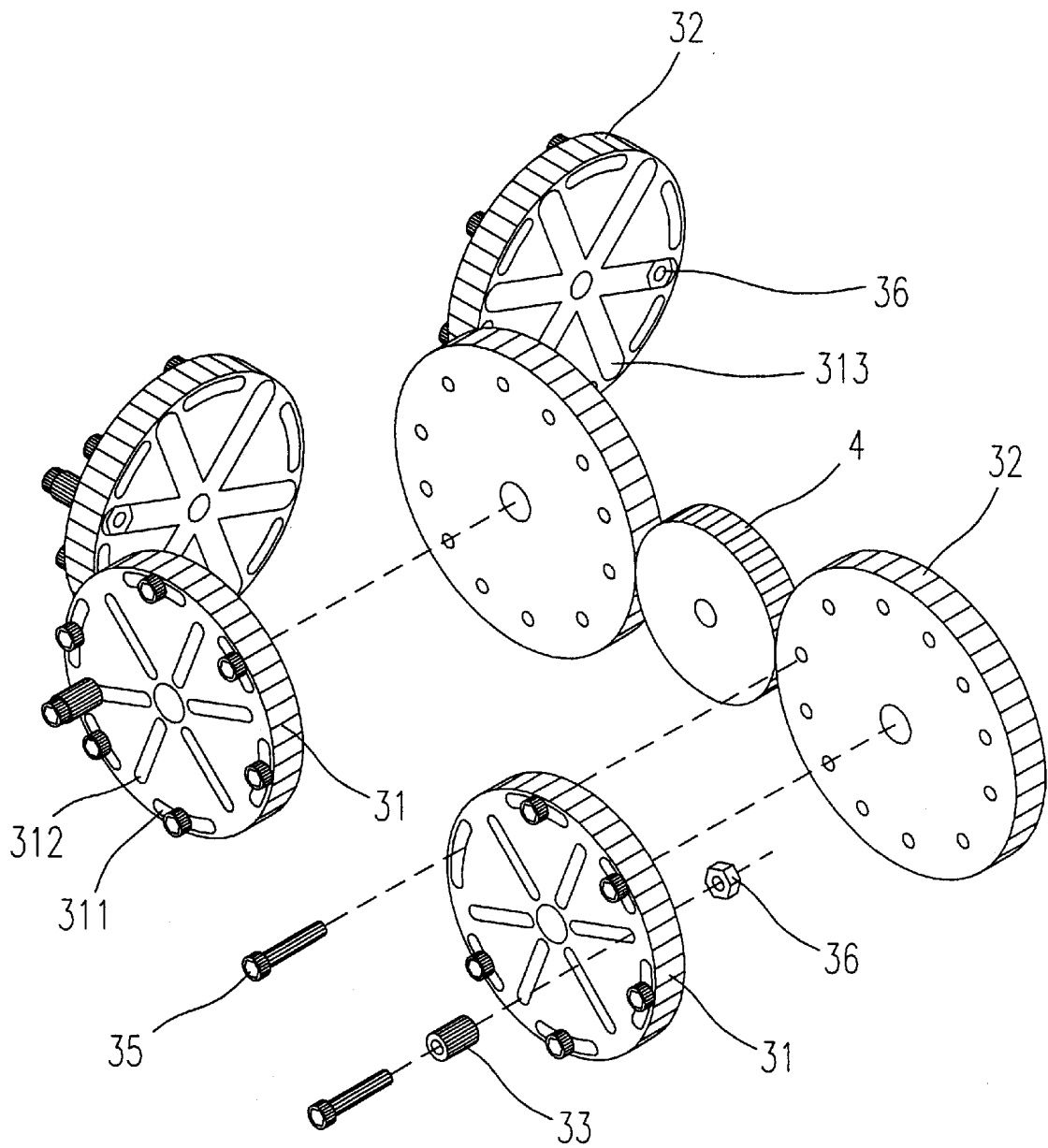
FIG. 4 is an exploded diagram of a mating weight unit according to the present invention.
Figure 5:
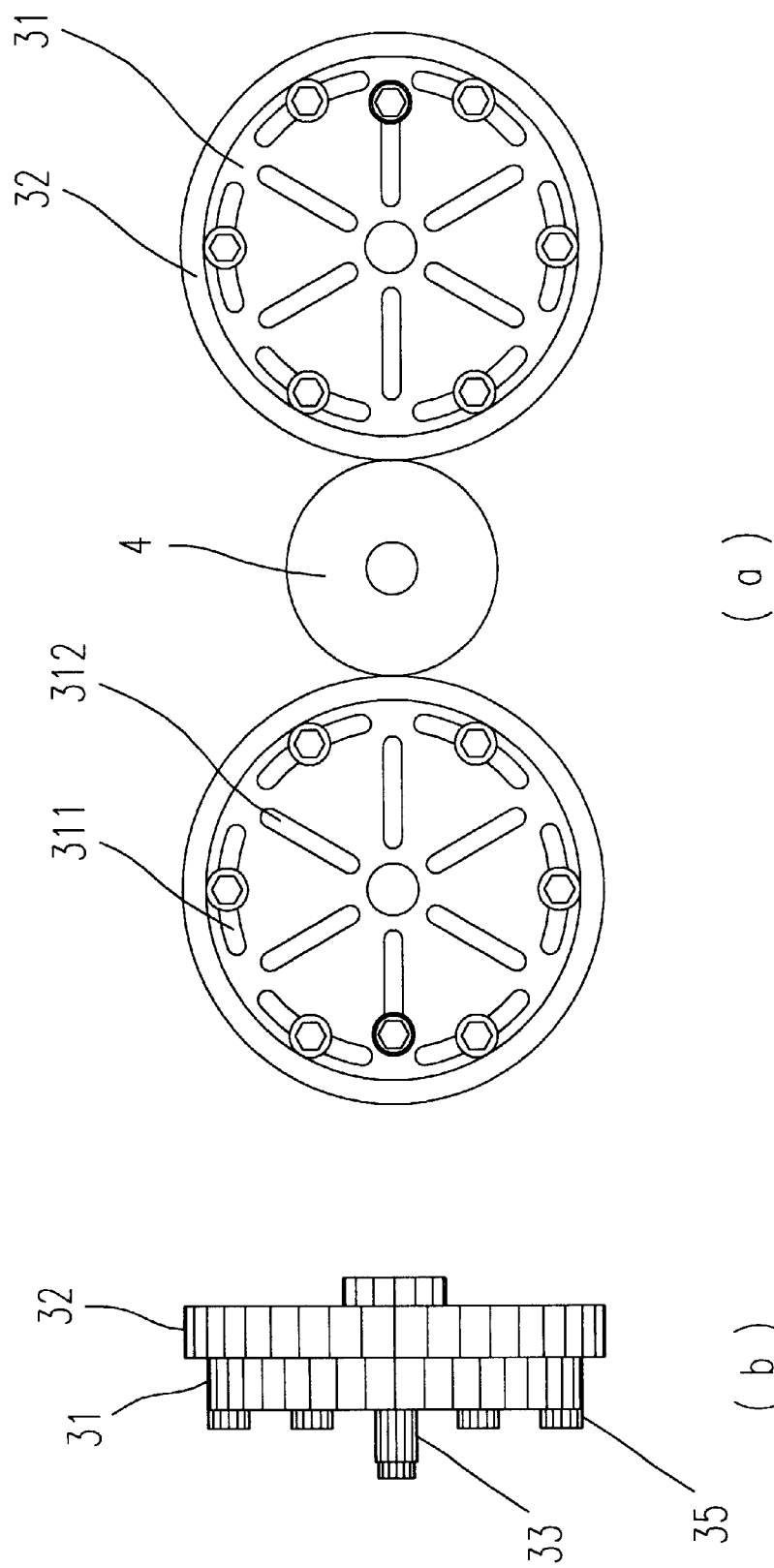
FIG. 5a is a front view of a mating weight unit according to the present invention.
FIG. 5b is a side view of a mating weight unit according to the present invention.
Figure 6:
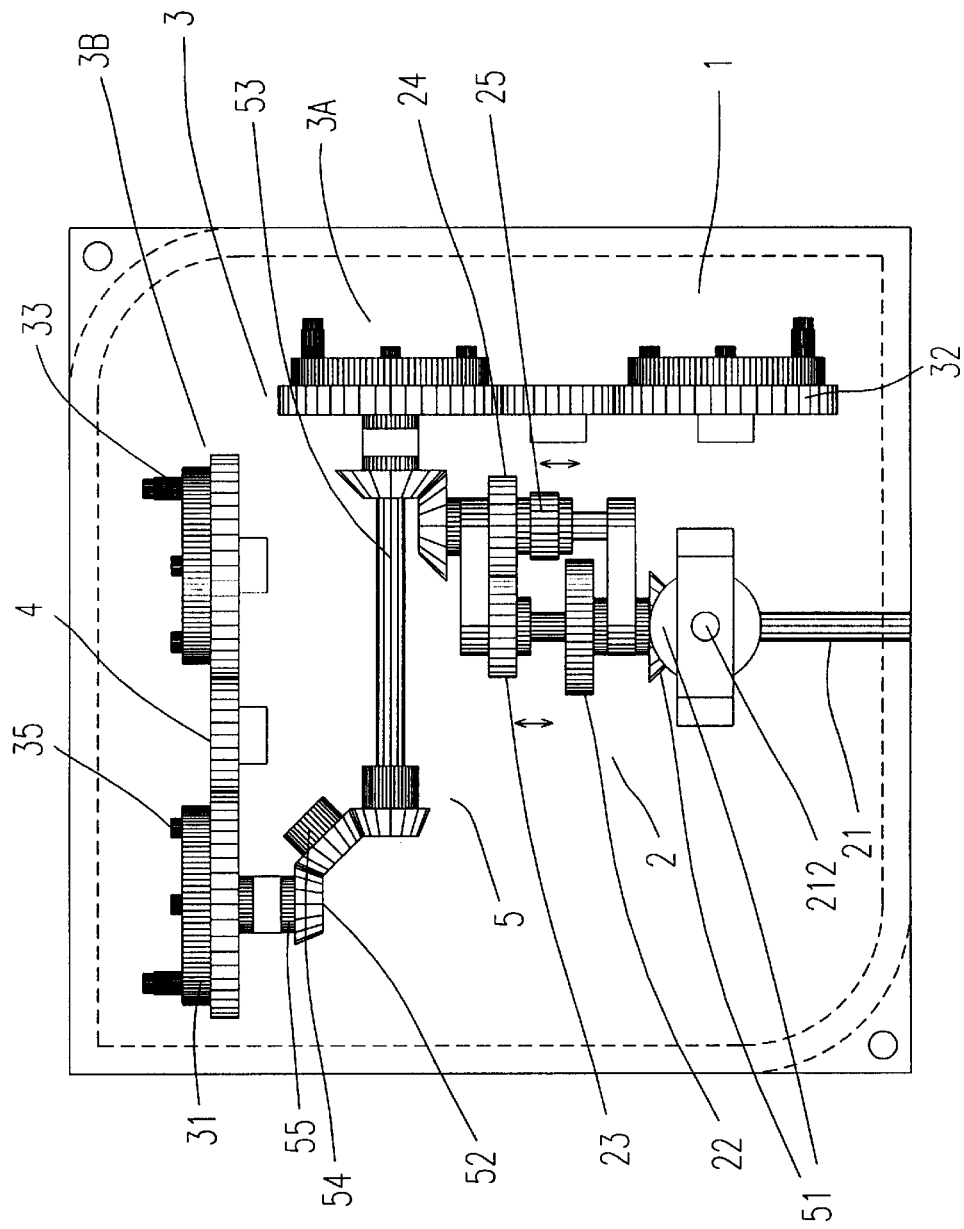
FIG. 6 is a top view of the shaking moment balancer according to the present invention.

As shown in FIG. 3, the mating weight units 3 further include two units 3A and 3B disposed in two directions U and V shown in FIG. 6, preferably two directions perpendicular to each other, such that the shaking moments in different directions can be balanced. The detailed structures of the two mating weight units 3A and 3B are the same. Taking the mating weight unit 3A as an example, it includes two rotating gears 32 and an idler 4. The idler 4 is disposed between the two rotating gears 32 for making the two rotating gears 32 rotate in the same direction such that an inertial moment can be formed. As shown in FIG. 4 and FIG. 5, a mating weight unit 3A or 3B further includes two mating weight disks 31 on the two rotating gears 32 respectively for setting the slots and the mating weights 33 thereon. The slots of the present invention includes a plurality of arc slots 311 set near the circumference of the mating weight disks 31 and a plurality of radial slots 312 radially extended from the center of the mating weight disks 31. The mating weight unit 3A or 3B may further include a plurality of screws 35 and nuts 36 for securing the mating weight 33 in the slots 312. By changing the position of the mating weights 33 in the slots 312 and the weight and number of the mating weights 33, the shaking moment of the machine can be balanced easily.

As shown in FIG. 6, the transmitting unit 5 includes a plurality of transmission shafts 53, 54, 55 and a plurality of bevel gears 52 on the ends of the shafts. The transmitting unit 5 is used for connecting the speed-changer device 2 with the mating weight units 3.

In conclusion, the shaking moment balancer of the present invention is modularized in a housing 1, and it is easy for users to maintain and replace. The mating weight units 3 of the present invention has a plurality set of gear trains and the shaking moment of a machine can be balanced precisely and conveniently. The mating weights 33 of the present invention are set in a plurality of slots 312 so that users can perform fine adjustments easily by moving the mating weights 33. Because the speed-changer device of the present invention allows the mating weight units 3 to rotate, at a rotating speed the same as one frequency term of the shaking moment, such that the term of the shaking moment of a machine can be balanced precisely.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A shaking moment balancer for balancing an unbalanced moment in a machine, comprising:

a housing;

an input shaft set mounted in said housing including a first input shaft, a second input shaft and a third input shaft, but only one of them is used as one input shaft for inputting a driving torque;

a mating weight unit mounted in said housing, having a plurality of mating weights for generating an inertial moment to balance said unbalanced moment, and having a plurality of slots for adjustably mounting said plurality of mating weights thereon; and a transmitting unit mounted in said housing and connected between said input shaft set and said mating weight units for driving said mating weight units to rotate in response to said driving torque.

2. The shaking moment balancer according to claim 1 further comprising a speed-changer device having a first and second pairs of gears mounted in said housing and connected to said transmitting unit for changing the rotation speed of said mating weight unit by changing the engagement state between said two pairs of gears.

3. The shaking moment balancer according to claim 2, wherein said first pair of gears have the same radius and tooth number for making said mating weight unit rotate at a first speed, the same as that of said input shaft; and said second pair of gears have different radiuses and tooth numbers for making said mating weight unit rotate at a second speed different to that of said input shaft.

4. The shaking moment balancer according to claim 3, wherein a gear ratio of said second pair of gears is an integer so that said rotation speed of said mating weight unit is an integral multiple of that of said input shaft.

5. The shaking moment balancer according to claim 4, wherein said gear ratio of said second pair of gears is 2, and said rotation speed of said matting weight unit is two times of that of said input shaft.

6. The shaking moment balancer according to claim 3, wherein said mating weight unit further comprises two rotating gears and an idler connected between said two rotating gears for making said two rotating gears rotate in the same direction.

7. The shaking moment balancer according to claim 6, wherein said mating weight unit further comprises two mating weight disks mounted on said two rotating gears respectively for setting said slots and said mating weights thereon.

8. The shaking moment balancer according to claim 7, wherein said mating weight unit further comprises a plurality of screws and nuts for securing said mating weights in said slots.

9. The shaking moment balancer according to claim 8, wherein said slots comprises a plurality of arc slots setting near the circumference of said mating weight disks and a plurality of radial slots radially setting from the center of said mating weight disks.

10. The shaking moment balancer according to claim 1, wherein said transmitting unit comprises a plurality of bevel gears and a plurality of transmission shafts for transmitting said driving torque to drive said mating weight unit.

11. A shaking moment balancer for balancing an unbalanced moment in a machine, comprising:

a housing;

an input shaft set mounted in said housing including a first input shaft, a second input shaft and a third input shaft, but only one of them is used as one input shaft for inputting a driving torque;

a first mating weight unit mounted in said housing and having a plurality of first mating weights for generating a first inertial moment in a first direction, and a plurality of first slots for adjustably mounting said plurality of first mating weights thereon;

a second mating weight unit mounted in said housing and having a plurality of second mating weights for generating a second inertial moment in a second direction, and a plurality of second slots for adjustably mounting said plurality of second mating weights thereon; and a transmitting unit mounted in said housing and connected to said input shaft set and said mating weight units for driving said mating weight units to rotate in response to said driving torque.

12. The shaking moment balancer according to claim 11 further comprising a speed-changer device having a first and second pairs of gears mounted in said housing and connected to said transmitting unit for changing the rotation speed of said mating weight units by changing the engagement state between said two pairs of gears.

13. The shaking moment balancer according to claim 12, wherein said first pair of gears have the same radius and tooth number for making said mating weight units rotate at a first speed, the same as that of said input shaft; and said second pair of gears have different radiuses and tooth numbers for making said mating weight units rotate at a second speed different to that of said input shaft.

14. The shaking moment balancer according to claim 13, wherein a gear ratio of said second pair of gears is an integer so that said rotation speed of said mating weight units is an integral multiple of that of said input shaft.

15. The shaking moment balancer according to claim 14, wherein said gear ratio of said second pair of gears is 2, and said rotation speed of said matting weight units is two times of that of said input shaft.

16. The shaking moment balancer according to claim 11, wherein each of said first and second mating weight units further comprises two rotating gears for setting said slots and said mating weights thereon and an idler connected between said two rotating gears for making said two rotating gears rotate in the same direction.

17. The shaking moment balancer according to claim 16, wherein each of said first and second mating weight units further comprise two mating weight disks mounted on said two rotating gears respectively for setting said slots and said mating weights thereon.

18. The shaking moment balancer according to claim 17, wherein each of said first and second mating weight units further comprises a plurality of screws and nuts for securing said mating weights in said slots.

19. The shaking moment balancer according to claim 18, wherein said slots comprises a plurality of arc slots setting near a circumference of said mating weight disks, and a plurality of radial slots radially setting from a center of said mating weight disks.

20. The shaking moment balancer according to claim 11, wherein said transmitting unit comprises a plurality of bevel gears and a plurality of transmission shafts for transmitting said driving torque to drive said mating weight units.

* * * * *